UNITED STATES PATENT OFFICE.

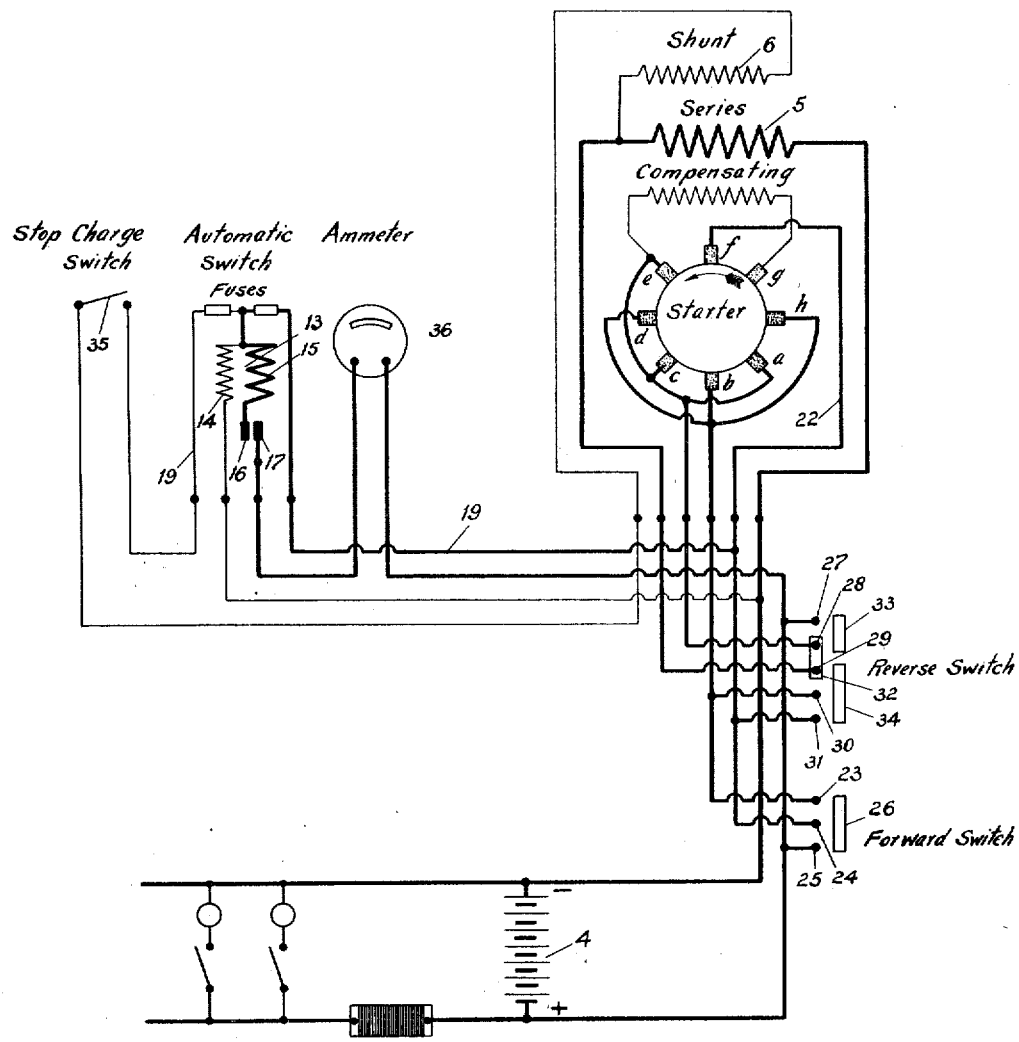

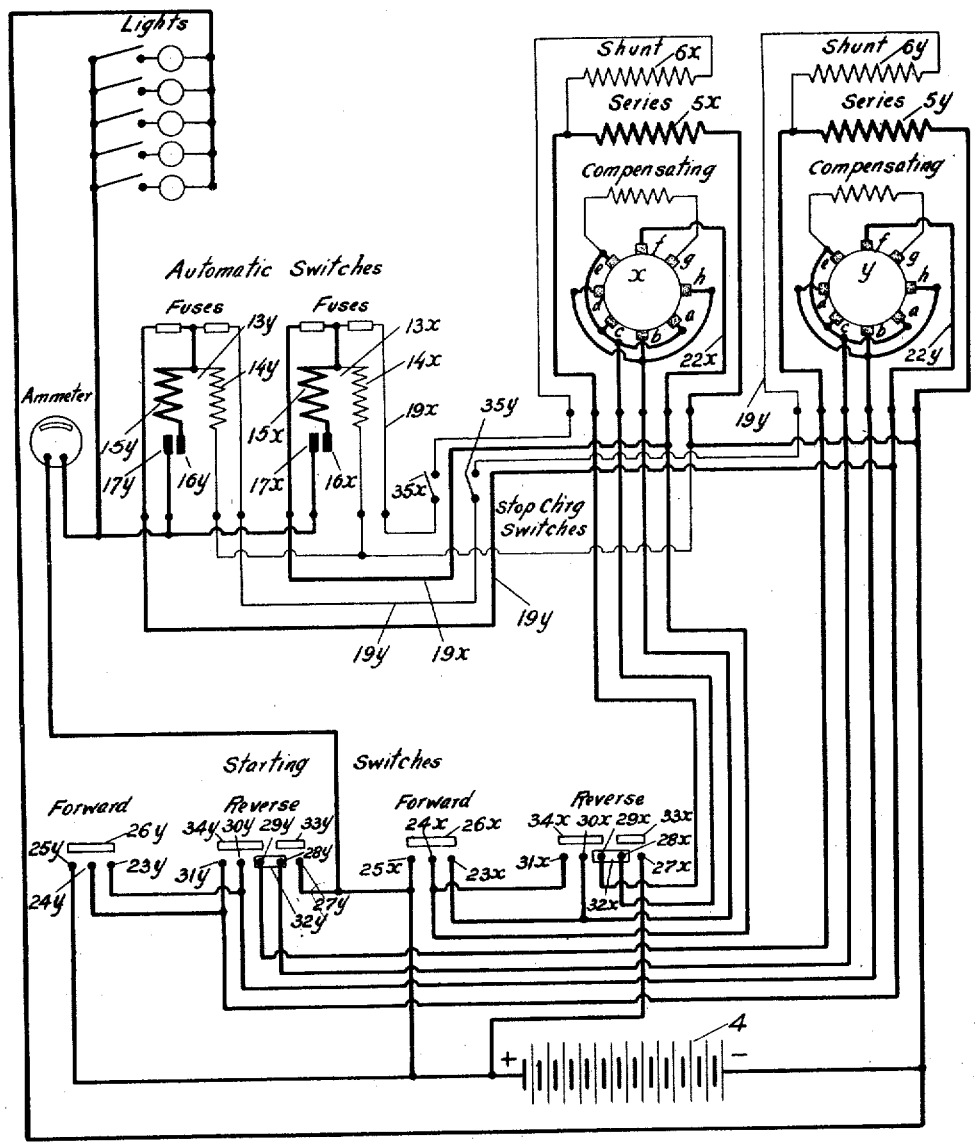

THOMAS ZIMMERMAN AND THOMAS R. DU BOIS, OF NIAGARA FALLS, NEW YORK, ASSIGNORS TO U. S. LIGHT & HEAT CORPORATION, OF NIAGARA FALLS, NEW YORK, A CORPORATION OF NEW YORK.

REVERSIBLE ENGINE-STARTING SYSTEM.

1,363,302.   Specification of Letters Patent.   Patented Dec. 28, 1920.

Application filed May 24, 1916. Serial No. 99,565.

*To all whom it may concern:*

Be it known that we, THOMAS ZIMMERMAN and THOMAS R. DU BOIS, citizens of the United States, residing at Niagara Falls, in the county of Niagara and State of New York, have invented new and useful Improvements in Reversible Engine-Starting Systems, of which the following is a specification.

This invention relates to reversible engine starting systems.

In certain classes of service, particularly marine service, it is desirable to provide a rotatable shaft, the direction of rotation of which is reversible at will. It is common practice to operate launches by means of a screw propeller driven by an internal combustion engine. Various expedients have been employed for reversing the direction of the launch, such as reversing the direction of rotation of the propeller shaft or changing the pitch of the propeller blades. The present invention relates to means for reversing the direction of rotation of the propeller shaft and has for one of its objects the accomplishment of that result without the use of change gearing between the engine and the propeller shaft.

A further object is to provide a system for operating the propelling mechanism of a boat in a forward or reverse direction, which system has a minimum of liability to get out of order.

A further object is to provide a system of the kind referred to, in which the number of operations necessary to set the boat in motion in either a forward or a reverse direction is reduced to a minimum.

A further object is to provide a system readily adaptable for use with a starting and generating dynamo-electric machine, whereby after the boat has been started in its forward direction, said dynamo-electric machine may provide the necessary energy to charge a storage battery to supply lights and to conserve energy for further starts.

A further object is to provide a starting and reversing system for boats having a plurality of propeller shafts.

Further objects will be apparent as the description proceeds.

Referring to the drawings:—

Fig. 3 represents a modification of the system disclosed in Fig. 2.

Fig. 4 represents the invention as applied to a system involving a plurality of dynamo electric machines each adapted to coöperate with a propeller shaft.

Figure 1:
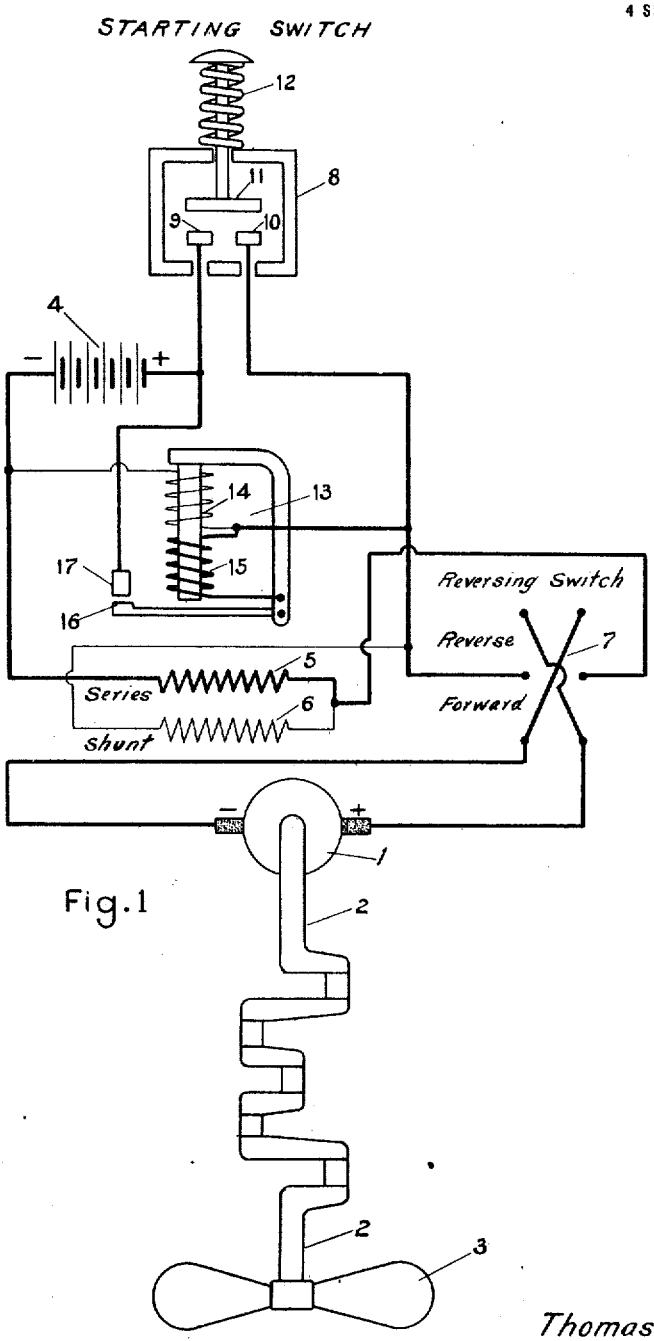
Figure 1 represents one embodiment of the present invention.

Referring first to Fig. 1, the numeral 1 indicates a dynamo-electric machine preferably adapted to operate either as a motor or a generator. Said dynamo-electric machine is shown direct connected to the crank shaft 2, constituting part of an internal combustion engine. Said crank shaft drives a propeller 3. A storage battery 4 is provided for the purpose of supplying energy to the dynamo-electric machine for starting purposes and for storing energy when said dynamo-electric machine is operating as a generator. Said dynamo-electric machine may be provided with a series winding 5 and a shunt winding 6, which will act cumulatively under starting conditions and differentially under generating conditions, whereby the charging current may be controlled in the well known manner. A reversing switch is indicated as a whole by the numeral 7, by which the polarity of the circuit applied to the terminals of the dynamo-electric machine may be reversed at will. A starting switch is indicated as a whole by the numeral 8, provided with the starting contacts 9 and 10 and the movable contact 11, which movable contact is normally held away from the stationary contacts by means of the spring 12. As shown in Fig. 1, one of said stationary contacts is connected to one terminal of the battery 4, while the other stationary contact is connected to one of the middle contacts of the reversing switch 7. The other of the middle contacts of the reversing switch is connected through the series winding 5 to the other side of the battery 4. The armature of the dynamo-electric machine 1 is connected in the circuit just described and the connections to its terminals may be reversed by means of the reversing switch 7. An automatic switch 13 of any preferred construction, is provided between the dynamo electric machine 1 and the battery 4. This automatic switch is provided with a shunt lifting coil 14 and a series holding coil 15. Said coils control the engagement of a movable switch 16 with a stationary contact 17, which contacts are adapted to close a circuit between the dynamo electric machine and the battery, as shown.

In the operation of the embodiment illustrated in Fig. 1, if it is desired to propel the boat in a forward direction, the reversing switch will be thrown in its lowermost position and the starting switch 8 will be closed. Circuit will now be complete from the battery 4, through the starting switch 8, left hand side of reversing switch 7, armature of dynamo-electric machine 1, left hand side of reversing switch 7, and series winding 5 back to the battery. A branch circuit through the shunt winding 6 may also be traced from the left hand side of covering switch 7 to the right hand side. The dynamo-electric machine will be started as a motor under the strong field due to the windings 5 and 6 acting cumulatively. This motoring action will turn the crank-shaft 2, starting the engine. Thereafter the crank-shaft will be actuated by the engine to drive the propeller 3 to move the boat in the forward direction. After the engine has been started, the operator will release the starting switch 8. When the engine drives the dynamo-electric machine at a sufficiently high speed to develop a voltage sufficient to charge the battery, the automatic switch will close in the manner well understood thus completing circuit between the dynamo-electric machine and the battery. The series winding 5 will now act differentially to the shunt winding 6 in the manner well understood, to hold the current output of the generator within safe limits.

Any suitable means may be provided for stopping charge when the battery is sufficiently charged.

When it is desired to move the boat in the backward direction from a position of rest, the operator will move the reversing switch 7 to its upper position and will close the starting switch. The connections to the armature of the dynamo electric machine will now be reversed and the armature will revolve as a motor in the reverse direction. To cause the engine to start in the reverse direction, any of the well known expedients for that purpose may be employed. The means for conditioning the engine for reversal may be operated independently of the reversing switch 7 or may be connected to move therewith. The particular means employed and the manner of operating same constitute no part of the present invention.

Figure 2:
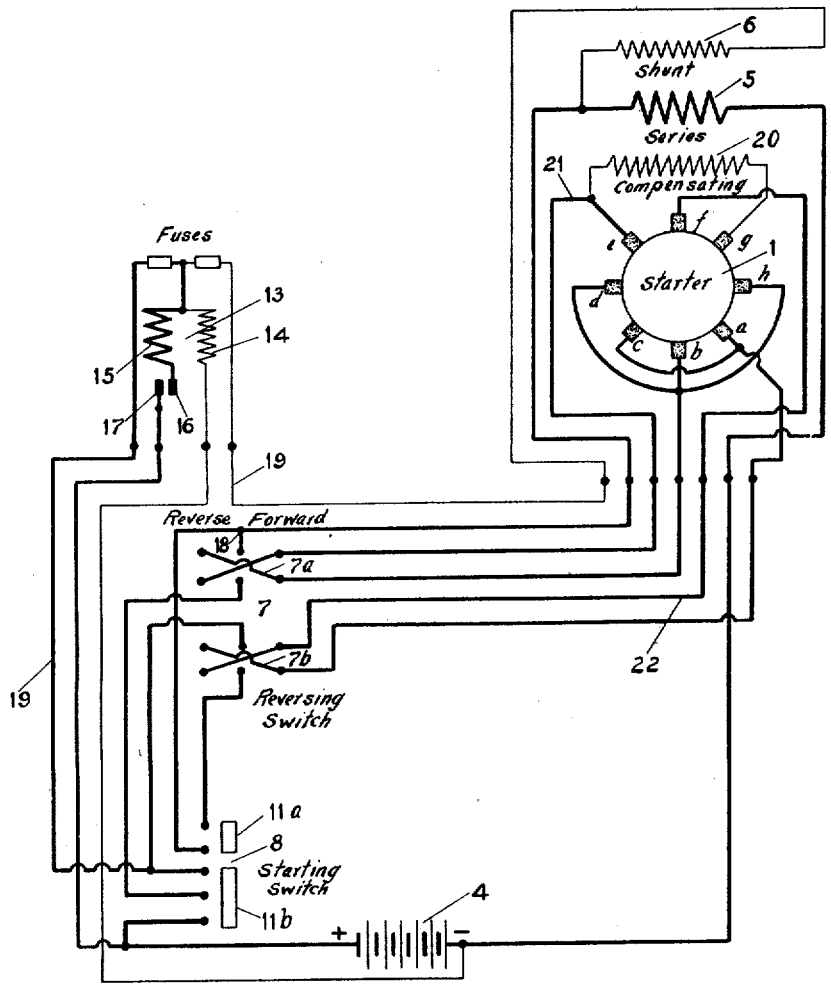
Fig. 2 represents the invention applied to a preferred type of starting and generating dynamo-electric machine.

Fig. 2 shows an embodiment of the present invention applied to the type of starting and generating dynamo-electric machine described in the application of Lewis W. Nelson, Serial No. 856,805, filed August 14, 1914, and the application of William A. Turbayne and Thomas R. Du Bois, Serial No. 29,067, filed May 19, 1915. Said dynamo-electric machine is provided with eight brushes, $a$, $b$, $c$, $d$, $e$, $f$, $g$ and $h$ as shown, all of which are used in starting, but of which only brushes $e$, $f$ and $g$ are used in generating A four pole reversing switch 7 is provided for reversing the connections to the armature of the dynamo-electric machine for the purpose of producing rotation in either direction at will. Said four pole reversing switch 7 is made up of two sections $7^a$ and $7^b$, the blades coöperating therewith being movable as one member.

A starting switch 8 is provided having a pair of movable contacts $11^a$ and $11^b$ movable as one member. An automatic switch 13 is also provided having the usual lifting coil 14 and a holding coil 15. The armature of the dynamo electric machine will be mechanically connected to the crank shaft of an internal combustion engine and to the propeller of the boat, as in Fig. 1. The various elements of the system specified above are connected by suitable conductors which will be referred to in the description of operation which follows.

When the operator desires to move the boat in a forward direction, he will move the reversing switch 7 to the right hand position and will close the starting switch 8. Current will now flow from the positive side of the battery through the movable contact $11^b$ to section $7^a$ of the reversing switch, to brushes $h$ $b$ and $d$ of the dynamo-electric machine and through section $7^b$ of the reversing switch to brush $f$ of the dynamo-electric machine. After passing through the various conductors of the armature, the current will leave the armature by means of brushes $a$, $c$, $e$ and $g$. Current from brushes $a$ and $c$ will flow through section $7^b$ of the reversing switch, through contact $11^a$ of the starting switch to the point 18. Current from the brushes $e$ and $g$ will flow through section $7^a$ of the reversing switch to the point 18. From point 18 current will flow through the series winding 5 to the negative side of the battery. The shunt winding 6 of the dynamo-electric machine will receive current from the positive side of the battery through contact $11^b$ and conductor 19. From the shunt winding 6 current will pass through the series winding 5 to the negative side of the battery. The effect of the shunt coil 6 will be cumulative with that of the series coil 5. The dynamo-electric machine will operate as a motor and will start the internal combustion engine to drive the propeller to move the boat in a forward direction.

After the engine has been started, the operator will release the starting switch 8. The internal combustion engine will continue to drive the armature of the dynamo-electric machine to act as a generator. As stated above, only brushes e, f and g will deliver generating current, the brushes e and g being connected, preferably through the compensating winding 20, to the conductor 21. The brush f is connected to the conductor 22. The circuit may now be traced from the brush f through conductor 22, section 7ᵇ of the reversing switch, conductor 19, lifting coil 14 of the automatic switch, series coil 5 to the point 18, through the section 7ᵃ of the reversing switch to the brushes e and g. When the dynamo-electric machine develops a voltage sufficiently high for charging the storage battery, the automatic switch will close in the well known manner. Circuit may now be traced from the brush f to the conductor 22, section 7ᵇ of the reversing switch, conductor 19, holding coil 15 and contacts 16 and 17 of the automatic switch to the positive side of the battery, through the battery, series winding 5, to the point 18, through section 7ᵃ of the reversing switch to the brushes e and g of the dynamo-electric machine. Any suitable means may be provided for stopping the charge of the battery when the charge is complete.

When it is desired to move the boat in the backward direction from a position of rest, the operator will throw the reversing switch 7 to its left hand position and will then close the starting switch 8. Current from the positive side of the battery will now flow through the section 11ᵇ of the starting switch, through section 7ᵃ of the reversing switch to brushes e and g, and through section 7ᵇ of the reversing switch to brushes a and c. Current, after circulating through the various armature conductors, will pass through the brushes d, b and h, through the section 7ᵃ of the reversing switch to the point 18. Current will also pass from the brush f through section 7ᵇ of the reversing switch, through section 11ᵃ of the starting switch to the point 18. From the point 18 current will pass through series winding 5 in the same direction as previously described, to the negative side of the battery. Current for exciting the shunt coil 6 will pass from the positive side of the battery through section 11ᵇ of the starting switch, conductor 19, to the shunt coil 6, whence it will pass through the series coil 5 to the negative side of the battery. Inasmuch as the armature connections are now reversed while the field connections remain unchanged, the armature of the dynamo-electric machine will revolve in the reverse direction, driving the propeller in a reverse direction. In this embodiment, as in the embodiment disclosed in Fig. 1, the proper means will be provided for permitting the engine to start in the reverse direction.

In Fig. 3 is disclosed a modification of the arrangement disclosed in Fig. 2, the four pole reversing switch being dispensed with. Fig. 3 differs from Fig. 2 in that only one switch need be operated for movement in the forward direction, and only one switch for movement in the reverse direction. In Fig. 3 the same dynamo-electric machine is disclosed as in Fig. 2, the conductors leading from the various brushes being connected to the two switches above referred to for producing either a forward or reverse rotation of the armature, as desired.

The forward switch comprises three stationary contacts 23, 24, 25, and one movable contact 26. The reversing switch comprises five stationary contacts 27, 28, 29, 30 and 31, and three movable contacts 32, 33, and 34. These three movable contacts are connected to move as one member and are normally held in the position shown, with the contact 32 bridging the contacts 28 and 29.

In the operation of Fig. 3, when the operator desires to move the boat in the forward direction, he will close the forward switch 26. Current may now flow from the positive side of the battery through contact 25, contact 26, contact 23 to brushes d, b and h. Current may also flow from contact 26 to contact 24, to brush f. The current may emerge from the brushes a, c, e and g, which are connected together, brushes e and g being shown as connected through a compensating winding, which compensating winding may be provided for the purpose of controlling the field flux for regulating purposes. Current will flow from brushes a, c, e and g to contact 28, through contacts 32 and 29, through the series winding 5, back to the negative side of the battery. Current for energizing the shunt winding 6 will pass from the positive side of the battery through contact 25, 26, contact 24 to conductor 19, from the switch 35 to the shunt winding 6, thence through the series winding 5 to the negative side of the battery. The dynamo-electric machine will now operate as a motor to start the internal combustion engine and drive the propeller. After the internal combustion engine has been started, it will continue to drive the propeller and will operate the dynamo-electric machine as a generator. Just as in the embodiment disclosed in Fig. 2, brushes c, f and g will be the generating brushes. When the dynamo-electric machine has developed a voltage sufficiently high to charge the storage battery 4, the automatic switch 13 will close. The circuits for the automatic switch may be traced as follows: From the brush f, conductor 22 leads to the conductor 19. From conductor 19 the circuit may be traced through the lifting coil 14, through the series coil 5, contacts 29, 32 and 28 to the brushes e and g. The lifting coil 14 will close contacts 16 and 17 of the automatic switch. Circuit may now be traced from the brush f through conductor 22, conductor 19, holding coil 13, contacts 16 and 17, through the ammeter 36 to the positive side of the battery, through the battery, through the series coil 5, to contacts 29, 32 and 28 of the brushes e and g. Circuit to the shunt field energizing coil 6 may be traced as follows: brush f, conductor 22, conductor 19, switch 35, shunt coil 6, contacts 29, 32 and 28, to brushes e and g. The dynamo-electric machine 1 will continue to charge the battery until the shunt field exciting winding 6 is open-circuited by the opening of the switch 35, which will kill the excitation of the generator. The switch 35 may be opened when the battery is fully charged.

When it is desired to move the boat in a backward direction, the operator will move the reversing switch, throwing contact 32 out of contact with contacts 28 and 29 and bringing contact 33 into contact with contacts 27 and 28, and bringing contact 34 into contact with contacts 29, 30 and 31. Circuit may now be traced from the positive side of the battery, through contacts 27, 33 and 28 to the brushes a, c, e and g. After passing through the conductors of the armature, current will pass from brushes d, b and h, through contact 30, contact 34, contact 29, to the series coil 5. From the brush f current will pass through the conductor 22 to the contact 31, contact 34, contact 29 to the series coil 5. From the series coil 5 the current will pass to the negative side of the battery. It will be noted that the armature connections are reversed while the field remains unchanged in direction, consequently, the dynamo-electric machine will start the engine in a reverse direction.

Referring now to Fig. 4, a system is disclosed involving two dynamo-electric machines for the purpose of operating two internal combustion engines on a twin screw vessel. Two forward and two reverse switches are provided for connecting the battery and the dynamo-electric machines. In this figure the two dynamo-electric machines are designated $x$ and $y$. The connections between each dynamo-electric machine and the battery are exactly the same as the connections between the battery and the dynamo-electric machine in Fig. 3. The conductors are represented by the same reference numerals that are used on Fig. 3, the suffix "x" or "y" being added thereto for the purpose of designating whether said conductors coöperate with dynamo-electric machine $x$ or $y$. The operation of each of the dynamo-electric machines in Fig. 4 will be clear from the description of the system disclosed in Fig. 3. It is clear that if it is desired to start the dynamo-electric machine $x$ in the forward direction, it will only be necessary to close contact $26^x$. If it is desired to start both dynamo-electric machines in the forward direction, it is necessary to close contacts $26^x$ and $26^y$. Whether only one dynamo-electric machine or both are used, they will start their respective internal combustion engines to drive the boat. After being started either or both of the internal combustion engines will drive one or both of the dynamo-electric machines as generators in a manner which will be understood from the description given above in connection with Fig. 3.

If it is desired to drive the boat in a backward direction such an operation may be done by starting the dynamo-electric machine $x$ or dynamo-electric machine $y$, or both, in the reverse direction by depressing the appropriate reversing switches.

Several embodiments of the present invention have been described for the purpose of illustrating the same. Various modifications will occur to those skilled in the art, which modifications will not depart from the spirit of the invention. It is desired that this case shall cover all such modifications.

Having described our invention, what we claim as new and desire to secure by Letters Patent of the United States is:—

1. In a system of propulsion, a pair of internal combustion engines, a plurality of dynamo-electric machines each of which is adapted to operate as a generator and also as a motor to start one of said internal combustion engines for driving a propeller, a storage battery, and a pair of switches for each dynamo-electric machine for connecting same to said battery, each of said switches being adapted to complete circuit from said battery to one of said dynamo-electric machines for motoring functions, the two switches of each of said pairs of switches having reverse motoring effects.

2. In a system of propulsion, a plurality of dynamo-electric machines, each of which is adapted to operate as a generator and also as a motor to start an internal combustion engine for driving a propeller, a storage battery, a pair of forward switches, each coöperating with one of said dynamo-electric machines to connect same to said battery for forward rotation, and a pair of reverse switches, each coöperating with one of said dynamo-electric machines to connect same to said battery for reverse rotation, said forward and reverse switches being independently operable.

In witness whereof, we have hereunto subscribed our names.

THOMAS ZIMMERMAN.
THOMAS R. DU BOIS.